US008895137B2

(12) United States Patent
Meyer Zu Berstenhorst et al.

(10) Patent No.: US 8,895,137 B2
(45) Date of Patent: Nov. 25, 2014

(54) SCRATCH RESISTANT TOP COATS HAVING GOOD ADHESION

(75) Inventors: Birgit Meyer Zu Berstenhorst, Moers (DE); Peter Capellen, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 730 days.

(21) Appl. No.: 12/973,079

(22) Filed: Dec. 20, 2010

(65) Prior Publication Data
US 2011/0151218 A1 Jun. 23, 2011

(30) Foreign Application Priority Data

Dec. 21, 2009 (DE) .................. 10 2009 059 774

(51) Int. Cl.
| B32B 7/02 | (2006.01) |
| B32B 9/04 | (2006.01) |
| B32B 27/00 | (2006.01) |
| C08K 5/544 | (2006.01) |
| C09D 5/32 | (2006.01) |
| C09D 7/12 | (2006.01) |
| B05D 7/02 | (2006.01) |
| B05D 7/00 | (2006.01) |
| C08K 5/3492 | (2006.01) |

(52) U.S. Cl.
CPC ............... C08K 5/5442 (2013.01); B32B 7/02 (2013.01); B32B 2307/71 (2013.01); B05D 7/02 (2013.01); B05D 7/57 (2013.01); C08K 5/34926 (2013.01); C09D 5/32 (2013.01); C09D 7/1233 (2013.01); C09D 7/1241 (2013.01)
USPC ........... 428/213; 428/420; 428/446; 428/448; 544/216; 544/219; 556/411

(58) Field of Classification Search
CPC .... C08K 5/5442; C08K 5/34926; C09D 5/32; C09D 7/1233; C09D 7/1241
USPC ............ 428/212–220, 423.1, 446–448; 528/10–85; 556/400–489; 544/196–216, 219–233
See application file for complete search history.

(56) References Cited

U.S. PATENT DOCUMENTS

| 4,373,061 | A | 2/1983 | Ching |
| 4,410,594 | A | 10/1983 | Olson |
| 4,847,120 | A * | 7/1989 | Gent .................... 427/387 |
| 5,041,313 | A | 8/1991 | Patel |
| 5,391,795 | A | 2/1995 | Pickett |
| 6,225,384 | B1 | 5/2001 | Renz et al. |
| 7,442,430 | B2 | 10/2008 | Buckel et al. |
| 2006/0074153 | A1 | 4/2006 | Boisseau et al. |
| 2007/0104956 | A1 | 5/2007 | Grandhee |
| 2008/0280149 | A1 * | 11/2008 | Higuchi et al. ......... 428/447 |
| 2009/0130489 | A1 | 5/2009 | Stollwerck et al. |
| 2009/0212587 | A1 | 8/2009 | Hobeika et al. |
| 2009/0272311 | A1 | 11/2009 | Shishido |

FOREIGN PATENT DOCUMENTS

| DE | 3120853 A1 | 2/1982 |
| DE | 102007050192 A1 | 4/2009 |
| DE | 102008010752 A1 | 8/2009 |
| DE | 102009019432 A1 | 11/2009 |
| EP | 0227070 A2 | 7/1987 |
| EP | 0339257 A2 | 11/1989 |
| EP | 0570165 A2 | 11/1993 |
| EP | 0672732 A1 | 9/1995 |
| EP | 0931820 A1 | 7/1999 |
| WO | WO-00/66675 A1 | 11/2000 |
| WO | WO-2006/108520 A1 | 10/2006 |
| WO | WO-2008/109072 A1 | 9/2008 |
| WO | WO-2009/049904 A1 | 4/2009 |
| WO | WO-2010/127805 A1 | 11/2010 |

* cited by examiner

Primary Examiner — Prashant J Khatri
(74) Attorney, Agent, or Firm — Drinker Biddle & Reath LLP

(57) ABSTRACT

The present invention relates to a multilayer system comprising a base layer consisting of a thermoplastic, a primer layer, and a scratch resistant layer consisting of a scratch resistant top coat, the multilayer system being characterized in that the primer layer contains a certain UV absorber and a certain amount of acid, preferably acetic acid, is added to the scratch resistant top coat.

9 Claims, No Drawings

SCRATCH RESISTANT TOP COATS HAVING GOOD ADHESION

RELATED APPLICATIONS

This application claims benefit to German Patent Application No. 10 2009 059 774.3, filed Dec. 21, 2009, which is incorporated herein by reference in its entirety for all useful purposes.

BACKGROUND OF THE INVENTION

The present invention relates to a multilayer system comprising a base layer consisting of a thermoplastic, a primer layer, and a scratch resistant layer consisting of a scratch resistant top coat, the multilayer system being characterised in that the primer layer contains a certain UV absorber and a certain amount of acid, preferably acetic acid, is added to the scratch resistant top coat.

Owing to its good optical, mechanical and thermal properties and because of its relatively low weight, polycarbonate is suitable as an alternative material to glass and as a material for use in glazing applications. Its relatively low scratch resistance and weathering resistance are disadvantageous, however. These drawbacks are often compensated for by the application of coatings containing UV absorbers.

Biphenyl-substituted triazines (WO 2006/108520 A) are a very good class of UV absorbers according to the current prior art. This class of substances has an outstanding absorption in the UV range of 320 to 380 nm and also a very high inherent UV stability (WO 2000/066675 A1, U.S. Pat. No. 6,225,384). Owing to their very pronounced aromatic nature, most substances of this class known to date dissolve well only in non-polar and moderately polar media. The known commercially available triazines can be used in UV-curing coatings formulated on a purely organic basis. However, these kind of coatings are not adequate for applications requiring a relatively high degree of scratch resistance.

If the material is to be effectively protected against abrasion and scratches, sol-gel silicate coatings (see e.g. EP-A 0 339 257, U.S. Pat. No. 5,041,313) and other hybrid coatings (EP-A 0 570 165) are the current prior art. The properties of organosilane-based coatings include, in addition to excellent weathering and light stability, resistance to heat, alkalis, solvents and moisture. However, as non-polar additives are not soluble in these coating systems, commercially available moderately polar, mostly hydroxy-containing UV absorbers and/or inorganic UV absorbers, such as titanium dioxide, zinc oxide or cerium dioxide, are used as UV absorbers, although their action leaves room for improvement (EP-A 0 931 820). DE 10200901943.2 describes how the polarity of UV absorbers having a triazine structure can also be improved by modification with trialkoxysilane groups. The objective of this application is to provide triazine derivatives which dissolve in the polar scratch resistant top coat.

Alternatively or additionally, non-polar or moderately polar UV absorbers can also be dissolved in a primer layer which is applied underneath the scratch resistant layer. The primer layer contains organic binder materials which have good adhesion both to thermoplastic surfaces and to the scratch resistant top coat. Primer layers for adhesion improvement between thermoplastic base layers and siloxane-based scratch resistant top coat are known for example from U.S. Pat. No. 5,041,313 and U.S. Pat. No. 5,391,795 and from the patents cited therein and are used as adhesion promoter in the coating of polycarbonate. In addition to promoting, these primer layers can also contain a UV absorber as mentioned in U.S. Pat. No. 5,041,313 and U.S. Pat. No. 5,391,795, thereby contributing to the weathering resistance of the coated part.

A layer structure consisting of polycarbonate, primer and top coat is known from EP-A 6 727 32 in which the primer layer contains a UV stabiliser based on resorcinol derivatives.

It is also known from WO 2009/049904 A1 that primer layers containing triazine-based UV absorbers of formula (V):

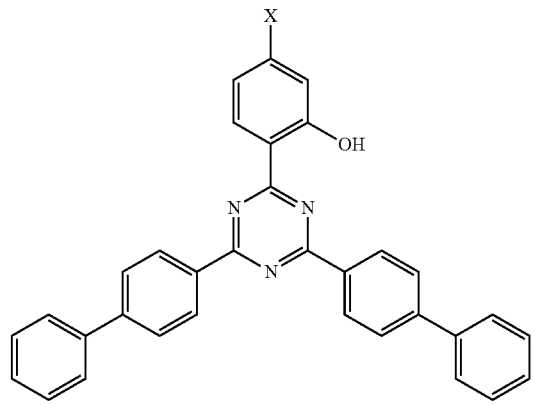

(V)

in which
X=$OR^6$, $OCH_2CH_2OR^6$, $OCH_2CH(OH)CH_2OR^6$ or $OCH(R^7)COOR^8$, in which
$R^6$=branched or unbranched $C_1$-$C_1$ alkyl, $C_2$-$C_{20}$ alkenyl, $C_6$-$C_{12}$ aryl or —CO—$C_1$-$C_{18}$ alkyl,
$R^7$=H or branched or unbranched $C_1$-$C_8$ alkyl, and
$R^8$=$C_1$-$C_{12}$ alkyl, $C_2$-$C_{12}$ alkenyl or $C_5$-$C_6$ cycloalkyl,
are particularly suitable and also have very good weathering resistance. The use of a combination of UV absorbers of the hydroxybenzophenone class, in particular resorcinol-based UV stabilisers with triazine-based UV stabilisers of formula (V), particularly in primer compositions for transparent thermoplastic substrates, such as in particular those consisting of polycarbonates, is also described as being particularly suitable.

The use of these triazines increases the UV absorption performance of the primer layer as compared with conventional primers in a comparable thickness. Alternatively, it is possible to lower the viscosity of the primer composition so that the thickness of the primer layer can be reduced. The minimum thickness of the UV-absorber-containing primer layer is determined by the desired UV protection, as the UV absorbers have a limited solubility in the primer composition.

If the concentration of the triazine UV absorber in the primer layer is too high, it precipitates out and the multilayer system becomes hazy.

To increase the adhesion of the scratch resistant top coat to the primer layer, it has proved advantageous to add acetic acid to it. Acetic acid in the scratch resistant-top coat leads to the formation of an interpenetration layer (IPL) between the primer and the scratch resistant top coat, which further improves the adhesion between the two layers. The scratch resistant top coat penetrates into the primer layer and a further mixed primer/scratch resistant interlayer is formed between the scratch resistant top coat layer and the primer layer. The formation of the IPL increases the long-term stability of the multilayer systems, as is demonstrated for example by reduced crazing in the scratch resistant top coat layer under weathering. The triazine compounds which were up to now used in the primer layer (see WO 2009/049904 A1) and which are suitable in particular for protecting polycarbonate, are insoluble in this IPL layer, however. Therefore when acetic acid is added to the scratch resistant top coat they concentrate in the remaining primer layer, whose thickness is reduced. As the acetic acid content in the scratch resistant top coat rises, the thickness of the IPL layer increases and hence the remaining primer layer becomes ever thinner, leading to haze caused by undissolved/precipitated UV absorber.

The objective was therefore to provide a multilayer system suitable for glazing applications which demonstrates both an effective and lasting UV protection combined with good weathering resistance and very good adhesion between the primer layer and the scratch resistant top coat arising from a thick interpenetration layer.

EMBODIMENTS OF THE INVENTION

An embodiment of the present invention is a multilayer system comprising a base layer comprising a thermoplastic, a primer layer, and a scratch resistant layer comprising a scratch resistant top coat, wherein said primer layer comprises a silylated UV absorber based on triazine and said scratch resistant layer is produced from a scratch resistant top coat comprising an acid.

Another embodiment of the present invention is the above multilayer system, wherein said scratch resistant layer is produced from a scratch resistant top coat comprising from 0.1% to 15.0% of acetic acid.

Another embodiment of the present invention is the above multilayer system, wherein said silylated UV absorber based on triazine is a UV-absorbing compound selected from the group consisting of compounds of formula (I)

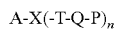

A-X(-T-Q-P)$_n$    (I)

wherein
A is

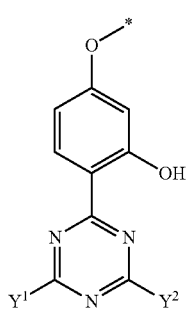

wherein
Y$^1$ and Y$^2$ are independently of each other substituents having the general formula

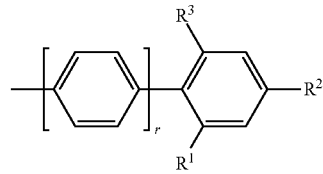

wherein
r is 0 or 1, and
R$^1$, R$^2$, and R$^3$
are independently of one another H, OH, C$_{1-20}$ alkyl, C$_{4-12}$ cycloalkyl, C$_{2-20}$ alkenyl, C$_{1-20}$ alkoxy, C$_{4-12}$ cycloalkoxy, C$_{2-20}$ alkenyloxy, C$_{7-20}$ aralkyl, halogen, —C≡N, C$_{1-5}$ haloalkyl, —SO$_2$R', —SO$_3$H, —SO$_3$M, wherein M is an alkali metal, —COOR', —CONHR', —CONR'R'', —OCOOR', —OCOR', —OCONHR', (meth)acrylamino, (meth)acryloxy, C$_{6-12}$ aryl optionally substituted by C$_{1-12}$ alkyl, C$_{1-12}$ alkoxy, CN, and/or halogen, C$_{3-12}$ heteroaryl optionally substituted by C$_{1-12}$ alkyl; C$_{1-12}$ alkoxy, CN and/or halogen,
wherein
R' and R''
are H, C$_{1-20}$ alkyl, C$_{4-12}$ cycloalkyl, C$_{6-12}$ aryl optionally substituted by C$_{1-12}$ alkyl, C$_{1-12}$ alkoxy, CN, and/or halogen, or C$_{3-12}$ heteroaryl optionally substituted by C$_{1-12}$ alkyl, C$_{1-12}$ alkoxy, CN, and/or halogen,
X is a linear or branched linker, wherein between the O atom of the A group and each T group there is a chain consisting of at least 3 atoms selected from the group consisting of carbon, oxygen, nitrogen, sulfur, phosphorus and silicon,
T is a urethane group —O—(C═O)—NH— or a urea group —NH—(C═O)—NH—,
Q is —(CH$_2$)$_m$—, wherein m is 1, 2, or 3,
P is a mono-, di-, or trialkoxysilane group,
n is a whole number from 1 to 5,
and said acid is acetic acid.

Another embodiment of the present invention is the above multilayer system, wherein said scratch resistant layer comprises a hybrid coating to which acetic acid is added.

Another embodiment of the present invention is the above multilayer system, wherein said thermoplastic is selected from the group consisting of polycarbonate, polyester carbonate, polyester, polyphenylene ether, graft copolymer, poly(meth)acrylate, polystyrene, and copolymers thereof.

Another embodiment of the present invention is the above multilayer system, wherein said primer layer is produced from a primer formulation comprising binder material comprising polyacrylate, solvent, a silylated UV absorber based on triazine, and optionally further stabilisers, UV stabilisers, and other additives.

Another embodiment of the present invention is the above multilayer system, wherein said primer layer contains from 0.01 weight % to 15.00 weight % of the silylated UV absorber based on triazine of formula (I).

Another embodiment of the present invention is the above multilayer system, wherein said multilayer system further comprises an interpenetration layer (IPL), wherein the base layer (B), primer layer(s) (Pr), scratch resistant layer(s) (SR), and interpenetration layers assume one of the following layer sequences:

(B)-(Pr)-(IPL)-(SR)
(SR)-(B)-(Pr)-(IPL)-(SR)
(SR)-(IPL)-(Pr)-(B)-(Pr)-(IPL)-(SR).

Another embodiment of the present invention is the above multilayer system, wherein the film thickness ratio of said interpenetration layer to said scratch resistant layer is greater than 10%.

Another embodiment of the present invention is the above multilayer system, wherein said multilayer system further comprises a functional or decorative layer.

Yet another embodiment of the present invention is a headlight cover, an architectural glazing system, or an automotive glazing systems comprising the above multilayer system.

Yet another embodiment of the present invention is a glazing system comprising the above multilayer system.

DESCRIPTION OF THE INVENTION

Surprisingly the use of silylated, triazine-based UV absorber derivatives in the primer layer has enabled the adhesion between the primer layer and scratch resistant layer to be increased through the formation of an interpenetration layer arising from the addition of acetic acid to the scratch resistant top coat, without leading to precipitation and hence hazing of the systems as is the case with conventional UV absorbers.

The invention therefore relates to a multilayer system comprising a base layer consisting of a thermoplastic, a primer layer, and a scratch resistant layer consisting of a scratch resistant top coat, the multilayer system being characterised in that the primer layer contains a silylated UV absorber based on triazine and a certain amount of acetic acid is added to the scratch resistant top coat.

Within the context of this invention, suitable thermoplastics for the base layer of the multilayer systems are polycarbonate, polyester carbonate, polyesters (such as polyalkylene terephthalates, for example), polyphenylene ethers, graft copolymers (such as ABS, for example), polyacrylates, in particular poly(meth)acrylates, and polystyrene and mixtures thereof. Owing to their high transparency and their exceptional long-term stability, the coatings according to the invention can be used in particular on transparent plastics such as polycarbonate, polyacrylates, in particular poly(meth)acrylates, polyesters and polystyrene as well as copolymers and mixtures (blends) thereof. Polycarbonate, in particular homopolycarbonate, copolycarbonate and/or thermoplastic polyester carbonate, is preferred. Bisphenol A-based (aromatic) polycarbonates above all are protected in a particularly advantageous manner against UV radiation.

Within the context of this invention, suitable primer layers of the multilayer systems are layers formed from a primer composition by curing.

The term curing here encompasses both chemical crosslinking and drying without a reaction, depending on the type of primer used.

Within the context of the present invention, the expression "primer composition" denotes the typical high-build primer formulations appropriate in this case, consisting of a binder material (a1) in a solvent (a2), a silylated UV absorber based on triazine (a3) and possibly further UV stabilisers (a4) and other additives or stabilisers such as antioxidants, hindered amines or dyes or inorganic fillers.

Particularly suitable as a basis for the primer layer and therefore preferred as a binder material (a1) are polyacrylates, suitable polyacrylate types being both those that simply dry during curing, without undergoing a chemical reaction, as well as those that are also crosslinked by means of a chemical reaction during curing. Polymethyl methacrylate is most particularly preferred. Suitable solvents (a2) are organic solvents such as alkanes, alcohols, ethers, esters or ketones, with emulsions of polyacrylate in water or water-based solvent blends also being suitable in principle.

These primer formulations are known in principle and are disclosed in detail in for example U.S. Pat. No. 5,391,795, U.S. Pat. No. 5,041,313 and U.S. Pat. No. 4,410,594. For example, SHP470® from Momentive Performance Materials Inc. is an adhesion promoter based on polymethyl methacrylate (a1) with inter alia 1-methoxy-2-propanol and diacetone alcohol as solvents (a2) and dibenzoyl resorcinol as UV absorber (a4). This primer is used to promote adhesion between a polycarbonate substrate and polysiloxane top coats, AS4700 from Momentive Performance Materials Inc. being preferably used here.

The primer formulation additionally contains a silylated triazine compound (a3), which is added to it. The suitable silylated triazine compounds (a3) are those of the general formula (I):

$$A\text{-}X(\text{-}T\text{-}Q\text{-}P)_n \qquad (I),$$

in which

A is

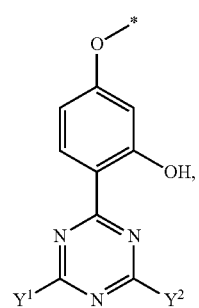

in which $Y^1$ and $Y^2$ are independently of each other substituents of the general formula

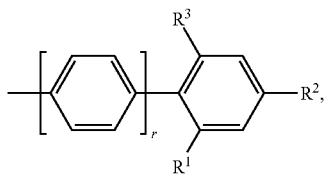

in which
- r is equal to 0 or 1 and is preferably equal to 1,
- $R^1$, $R^2$, $R^3$ independently of one another denote H, OH, $C_{1-20}$ alkyl, $C_{4-12}$ cycloalkyl, $C_{2-20}$ alkenyl, $C_{1-20}$ alkoxy, $C_{4-12}$ cycloalkoxy, $C_{2-20}$ alkenyloxy, $C_{7-20}$ aralkyl, halogen, —C≡N, $C_{1-5}$ haloalkyl, —$SO_2R'$, —$SO_3H$, —$SO_3M$ (M=alkali metal), —COOR', —CONHR', —CONR'R'', —OCOOR', —OCOR', —OCONHR', (meth)acrylamino, (meth)acryloxy, $C_{6-12}$ aryl (optionally substituted by $C_{1-12}$ alkyl, $C_{1-12}$ alkoxy, CN and/or halogen), $C_{3-12}$ heteroaryl (optionally substituted by $C_{1-12}$ alkyl, $C_{1-12}$ alkoxy, CN and/or halogen), and in which R' and R'' denote —H, $C_{1-20}$ alkyl, —$C_{4-12}$ cycloalkyl, $C_{6-12}$ aryl (optionally substituted by $C_{1-12}$ alkyl, $C_{1-12}$ alkoxy, CN and/or halogen) or $C_{3-12}$ heteroaryl (optionally substituted by $C_{1-12}$ alkyl, $C_{1-12}$ alkoxy, CN and/or halogen),
- T is a urethane group —O—(C═O)—NH— or a urea group —NH—(C═O)—NH— and is preferably a urethane group —O—(C═O)—NH—,
- Q is —$(CH_2)_m$—, in which m=1, 2 or 3,
- P is a mono-, di- or trialkoxysilane group, in which alkoxy preferably stands for methoxy, ethoxy or (2-methoxy) ethoxy,
and
- n denotes a whole number between 1 and 5,
- X is a linear or branched linker, characterised in that
  - between the O atom of the A group and each T group there is a chain consisting of at least 3, preferably 4 atoms selected from carbon, oxygen, nitrogen, sulfur, phosphorus and/or silicon in the chain. It can for example be an (optionally substituted) hydrocarbon chain —$(CR_2)$—$_j$, in which j is a whole number greater than 3, or it can be an optionally mono- or polysubstituted, including differently substituted, hydrocarbon chain interrupted by O, N, S, P and/or Si, for example a —$CR_2$—(C═O)—O—$CR_2$— chain. The radicals R preferably denote independently of one another H or alkyl radicals.

Of the compounds of the general formula (I) the compounds of the general formula (II) are preferred:

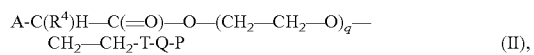

corresponding to

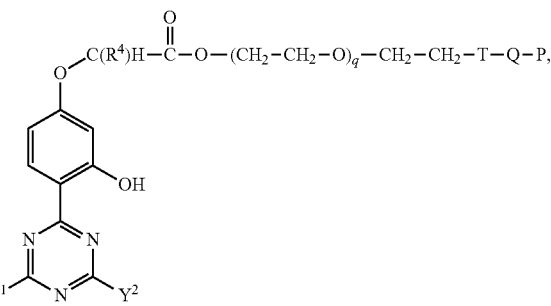

in which $R^4$ denotes —H or $C_{1-20}$ alkyl and q=0, 1, 2 or 3.

Likewise preferred are compounds of the general formula (I) where n≥2 (formula III)

In formulae (II) and (III) A, $Y^1$, $Y^2$, X, T, Q and P have the meanings described under formula (I).

The synthesis of such triazines can take place in a manner analogous to the production process described in the already cited DE 10200901943.2. Reference is hereby made to the entire disclosure of DE 10200901943.2 and in particular to the description of the production of triazines and to the embodiment examples described therein.

Of the compounds having the general formula (I) the following compounds are most particularly preferred:

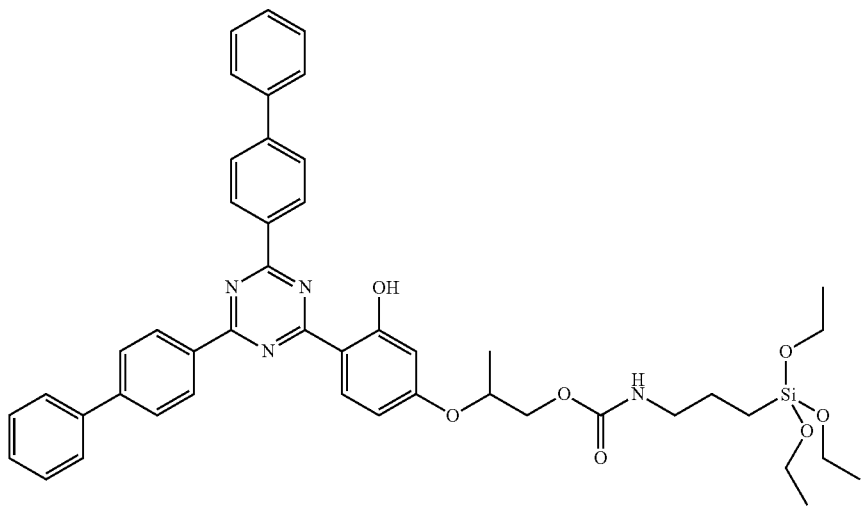

(I.1)

-continued
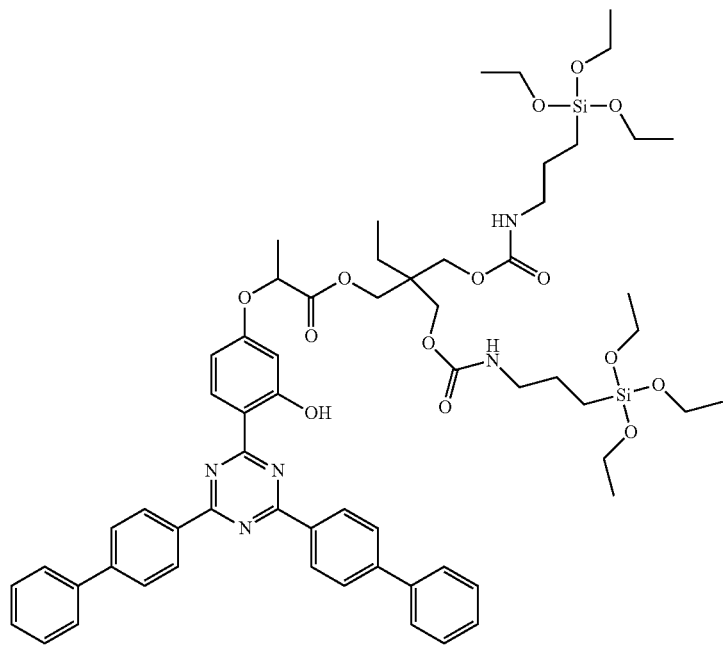
(I.2)
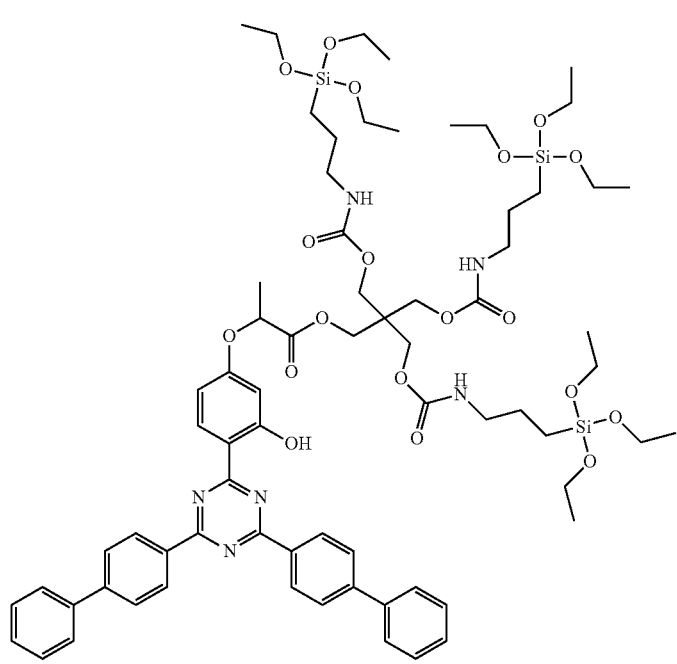
(I.3)

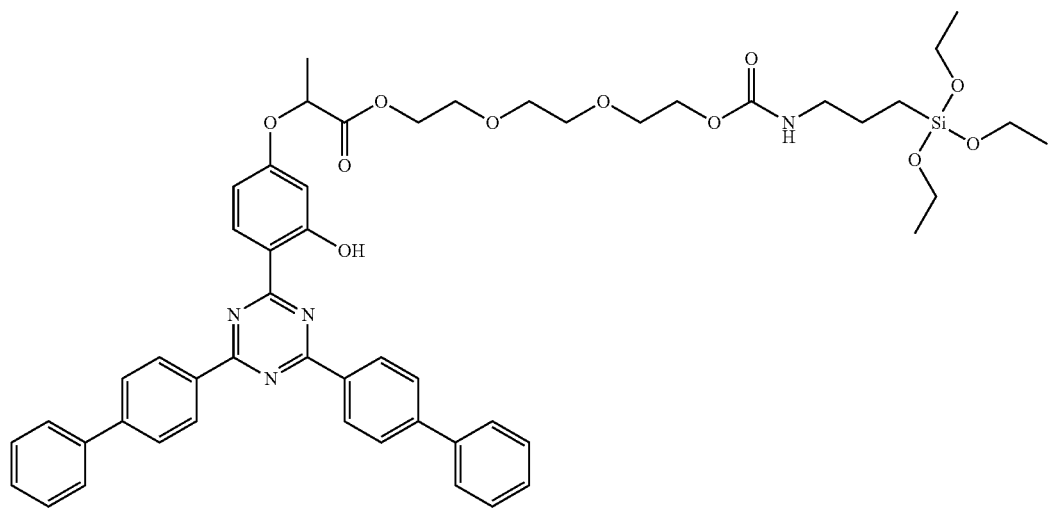
(I.4)
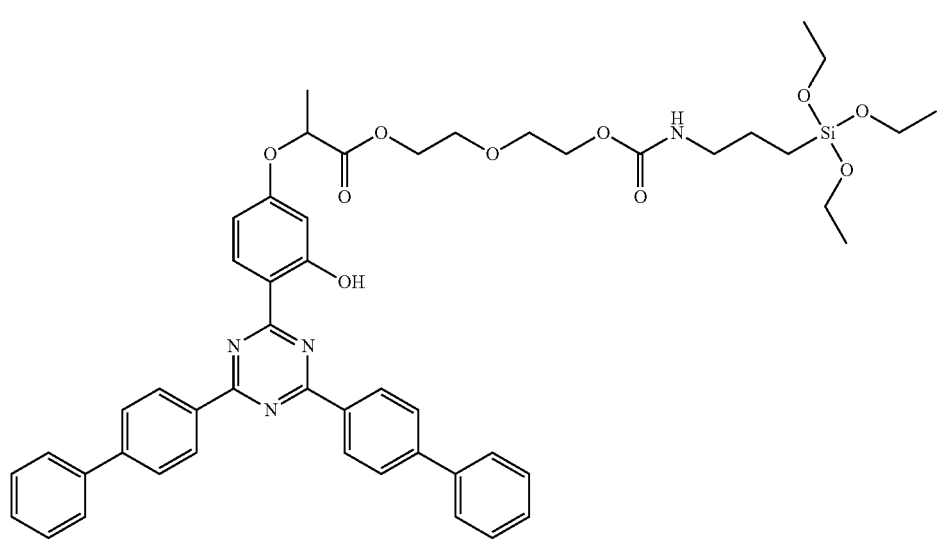
(I.5)
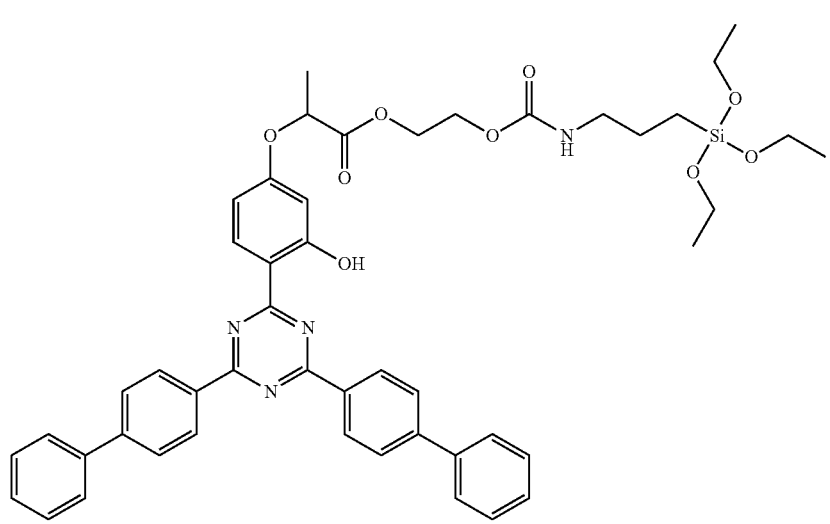
(I.6)

(I.7)

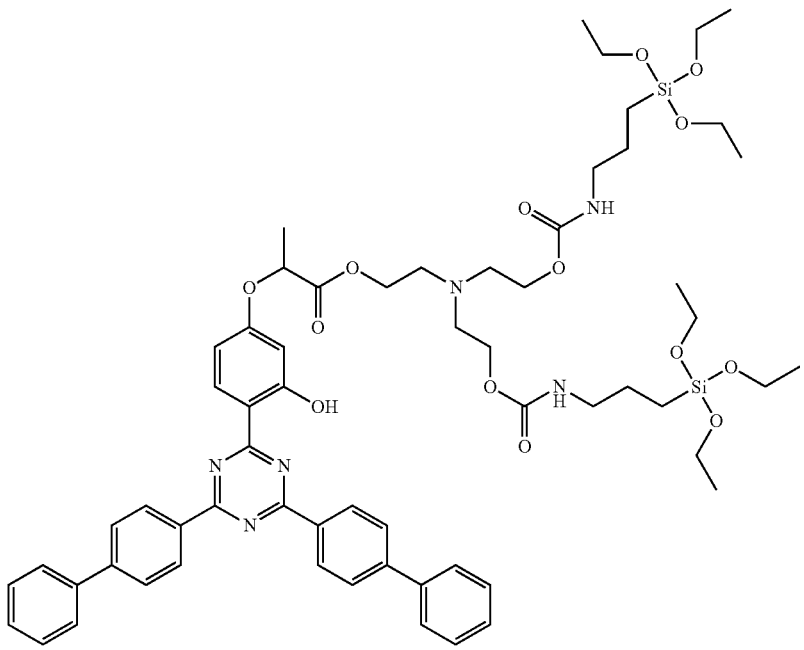

(I.8)

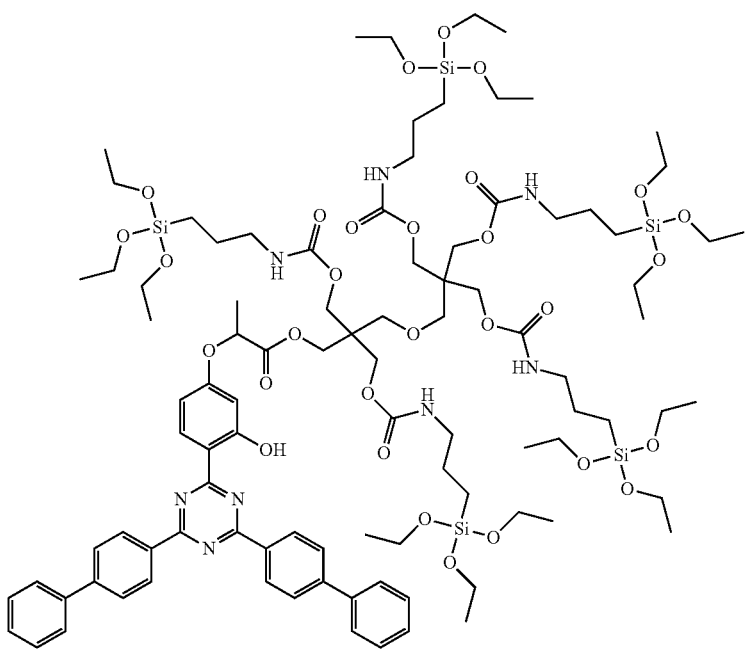

The primer layer can additionally contain further UV absorbers differing from the compounds of formula (I). Suitable UV absorbers are derivatives of the following general groups: 2-hydroxybenzophenones, 2-(2-hydroxyphenyl) benzotriazoles, 2-(2-hydroxyphenyl)-1,3,5-triazines, oxalanilides, 2-cyanoacrylates, benzylidine malonates and formamidines or modified triazines of the general formula (V).

The general production process for a primer composition is described here by way of example, but without being restricted thereby, on the basis of the commercially available SHP470® with a solids content of approximately 10% and an absorbance of around 1.2 at 340 nm and with a film thickness of 2 from Momentive Performance Materials Inc., Wilton, Conn., USA. SHP470® is a adhesion promoter based on polymethyl methacrylate (component (a1)) with inter alia 1-methoxy-2-propanol and diacetone alcohol as solvents (component (a2)) and a dibenzoyl resorcinol derivative as UV absorber (component (a4)). The diluted SHP470® (solids content approximately 6 wt. %) has a viscosity of >90 s measured in accordance with DIN EN ISO 2431 at 23° C. and with a 2 mm cup. This primer is used to promote adhesion between a polycarbonate substrate and polysiloxane top coats, AS4700® from Momentive Performance Materials Inc. being preferably used here. The SHP470® is preferably diluted to 20 to 95%, particularly preferably to 25 to 90%, preferably with alcohols, particularly preferably with diacetone alcohol, methoxypropanol or mixtures thereof, giving a solids content of approximately 2.0 to 9.5 wt. %, preferably 2.5 to 9.0 wt. %.

This solution is mixed with 0.01 wt. % to 15.00 wt. %, preferably 0.10 wt. % to 10.00 wt. %, particularly preferably 3.00 wt. % to 9.00 wt. %, of a silylated triazine UV absorber of the general formula (I) (component (a3)) and homogenised by suitable means during and/or after that process. It is advantageous to dissolve the UV absorber in diacetone alcohol, methoxypropanol or mixtures thereof and to add it to the SHP470® in that form. The ideal dilution ratio is dependent on the size and geometry of the component and on the coating application method and should be adjusted to the individual case.

Suitable scratch resistant top coats for the scratch resistant layer are coatings in which the addition of acetic acid leads to the formation of an interpenetration layer with the primer layer. These are for example so-called sol-gel coatings and other hybrid coatings, in particular polysiloxane based coatings, such as are known for example from U.S. Pat. No. 4,373,061, U.S. Pat. No. 4,410,594, U.S. Pat. No. 5,041,313, or from U.S. Pat. No. 5,391,795, with silicate coatings (water glass) and nanoparticle-containing formulations also being mentioned here. According to the invention acetic acid is added to the scratch resistant top coat, they are then applied to the primer layer and subsequently cured to form a multilayer product having good adhesion.

Within the meaning of the present invention sol-gel coatings are coatings produced by the sol-gel process. The sol-gel process is a process for synthesising non-metallic, inorganic or hybrid polymeric materials from colloidal dispersions known as sols.

Hybrid coatings within the meaning of the present invention are based on the use of hybrid polymers as binders. Hybrid polymers (hybrid: from the Latin, meaning "of dual origin") are polymeric materials combining structural units of different material classes at a molecular level. Through their structure hybrid polymers can display completely new combinations of properties. Unlike composite materials (defined phase boundaries, weak interactions between phases) and nanocomposites (use of nanoscale fillers), the structural units of hybrid polymers are linked with one another at a molecular level. This is achieved by means of chemical processes such as the sol-gel process for example, with which inorganic networks can be built up. Organic oligomer/polymer structures can additionally be generated through the use of organically reactive precursors, for example organically modified metal alkoxides. Acrylate coatings containing surface-modified nanoparticles, which form an organic/inorganic network after curing, are likewise defined as hybrid coatings.

Scratch resistant top coats can be produced for example from sol-gel coating solutions by hydrolysis of aqueous dispersions of colloidal silicon dioxide and an organoalkoxysilane or mixtures of organoalkoxysilanes of the general formula $RSi(OR')_3$, in which in the organoalkoxysilane(s) of the general formula $RSi(OR')_3$ R denotes a monovalent $C_1$ to $C_6$ alkyl radical or a wholly or partially fluorinated $C_1$ to $C_6$ alkyl radical, a vinyl or allyl unit, an aryl radical or a $C_1$ to $C_6$ alkoxy group. R is particularly preferably a $C_1$ to $C_4$ alkyl group, a methyl, ethyl, n-propyl, isopropyl, tert-butyl, sec-butyl or n-butyl group, a vinyl, allyl, phenyl or substituted phenyl unit. The —OR' units are selected independently of one another from the group comprising $C_1$ to $C_6$ alkoxy groups, a hydroxy group, a formyl unit and an acetyl unit.

The colloidal silicon dioxide is obtainable for example as Levasil® 200 A (HC Starck), Nalco 1034A (Nalco Chemical Co), Ludox® AS-40 or Ludox® LS (GRACE Davison). The following compounds are mentioned as organoalkoxysilanes by way of example: 3,3,3-trifluoropropyl trimethoxysilane, methyltrimethoxysilane, methyltrihydroxysilane, methyltriethoxysilane, ethyltrimethoxysilane, methyltriacetoxysilane, ethyltriethoxysilane, phenyltrialkoxysilane (e.g. phenyltriethoxysilane and phenyltrimethoxysilane) and mixtures thereof.

Organic and/or inorganic acids or bases for example can be used as catalysts.

In one embodiment the colloidal silicon dioxide particles can also be formed in situ by pre-condensation starting from alkoxysilanes (see in this regard "The Chemistry of Silica", Ralph K. Iler, John Wiley & Sons, (1979), p. 312-461).

Hydrolysis of the sol-gel solution is stopped or slowed down dramatically by adding solvents, preferably alcoholic solvents, such as for example isopropanol, n-butanol, isobutanol or mixtures thereof.

The scratch resistant top coat can furthermore also contain additives and/or stabilisers, such as for example levelling agents, surface additives, thickening agents, pigments, dyes, catalysts, IR absorbers, UV absorbers and/or adhesion promoter. The use of hexamethyl disilazane or comparable compounds, which can lead to a reduced susceptibility to crazing in the coatings, is also possible (cf. also WO 2008/109072 A).

One embodiment additionally contains silylated UV absorbers, including for example such compounds of formula (I).

Siloxane-based sol-gel scratch resistant top coats are obtainable for example from Momentive Performance Materials under the product names AS4000®, AS4700®, PHC587® and PHC587B®.

Acetic acid is added according to the invention to the scratch resistant top coat formulations. The scratch resistant top coat are then applied onto the primer layer and subsequently cured to form a multilayer product having good adhesion. The specific production process for the coating formulations according to the invention is naturally dependent on the commercial primer used. The incorporation of acetic acid preferably takes place via the addition of 0.1% to 15.0%, preferably 0.5% to 10.0% and particularly preferably 1.0 to 8.0% of acetic acid (100% acetic acid) and subsequent homogenisation by stirring or recirculation. Alternatively or additionally, other organic or mineral acids which are capable of partially dissolving the primer layer can also be used.

The primer composition and scratch resistant top coat can be applied to the corresponding substrates containing the base layer by conventional methods and then cured under suitable conditions. Application can take place for example by dip coating, flow coating, spray coating, knife or roller coating or any other suitable technique; then any solvent optionally present is evaporated and the coating is cured at room temperature or elevated temperature or by UV light. Details of application by conventional methods can be found for example in Organic Coatings: Science and Technology, John Wiley & Sons 1994, chapter 22, pages 65-82.

After allowing the solvent to flash off at room temperature, the primer layer(s) can either be baked at elevated temperature (bake-on-bake process) or overcoated directly with the sol-gel solution (wet-on-wet process).

The multilayer systems according to the invention can be used wherever a UV-unstable substrate is to be lastingly protected against UV radiation, primarily from sunlight or from an artificial radiation source. Many plastics can be lastingly protected against photochemical degradation by the coatings according to the invention. The coating of glass, which is likewise possible, serves not to protect the substrate, however, but to screen out long-wave UV radiation (≥300 nm), which penetrates standard window glass, for example, almost completely.

Thermoplastics lastingly protected in this way, in particular polycarbonates, can be used for example for the glazing of buildings and vehicles in cases where yellowing must be prevented for long periods and where good adhesion between the layers is necessary in order to prevent crazing.

In the case of thermoplastics, primarily extruded and injection-moulded articles can be coated, in the form of films, coextruded films, sheets, multi-wall sheets and largely flat substrates, for example. There are also applications in the area of one-component and two-component injection-moulded parts, for example in the form of headlight covers and of architectural and automotive glazing systems.

Depending on the application, the primer (Pr) and/or scratch resistant (SR) layers are conveniently applied to one or more sides of the base layers (B). Two-dimensional substrates such as films or sheets can correspondingly be coated on one or two sides. According to the invention an interpenetration layer (IPL) is formed between the primer and scratch resistant layers. The multilayer systems according to the invention therefore preferably comprise the following sequences of layers:
(B)-(Pr)-(IPL)-(SR)
(SR)-(B)-(Pr)-(IPL)-(SR)
(SR)-(IPL)-(Pr)-(B)-(Pr)-(IPL)-(SR).

In a preferred embodiment the film thickness ratio of the interpenetration layer (IPL) to the scratch resistant layer (SR) is ≥10%, particularly preferably ≥12% and/or ≥15%.

The multilayer systems can moreover comprise further functional or decorative layers. In addition to the primer and scratch resistant layers, suitable further coatings include for example IR-absorbent layers, IR-reflective layers, electrically conductive layers, electroluminescent layers, decorative coloured and printed layers, electrically conductive printed layers, such as are used for example for heated car windows, optionally also layers containing heating wires, anti-reflective layers, no-drop coatings, anti-fog coatings, anti-fingerprint coatings and/or combinations thereof. These coatings can be applied or included as intermediate layers and/or as outer layers. Such layers can be applied for example by coextrusion methods, by lamination or by coating.

The multilayer systems can moreover be overcoated on their outer sides with further coatings, which can serve for example to further improve the mechanical properties (scratch resistance). It is likewise possible to apply a plasma layer, which can offer additional barrier and scratch protection. This plasma layer is applied by depositing reactive species in accordance with the prior art—for example by plasma-enhanced chemical vapour deposition PCVD or by magnetron sputtering (e.g. US-A 2007/104956).

The following embodiment examples are intended to illustrate the invention, without however restricting its scope.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES a) Test Methods

Solids Content Determination (Method A)

The solids content of the coatings was determined using a Sartorius MA40 solids tester by evaporating a weighed wet coat sample at 110° C. until a constant weight was reached. The solids content is then calculated as a percentage from the quotient of the masses before and after evaporation. In the simplest case, the solids content of the wet coat after curing of the coating is the weight of the coating less the weight of the solvent.

Film Thickness Determination (Method B)

The film thicknesses of the cured coating or the total film thicknesses of the coatings are determined by white light interference using an Eta SD 30 instrument from Eta Optik GmbH, Germany.

Haze Measurement (Method C)

The haze of the coated PC sheets was determined in accordance with ASTM D 1003 using a Haze Gard Plus from Byk-Gardner. A total film thickness of approx. 6 µm determined by white light interference was defined as the measuring point.

Determination of the Film Thickness of the Interpenetration Layer (IPL) (Method D)

The film thicknesses of the scratch resistant top coat, the interpenetration layer and the primer were determined by means of transmission electron microscopy measurements (thin section, ultramicrotomy) using an EM 208 from FEI, USA. The measurements were likewise carried out at a total film thickness of approx. 6 µm determined by white light interference.

Absorbance Measurement (Method E)

In order to be able to compare the UV-absorption of the various primer layers, the transmission was determined in each case in the range between 200 and 500 nm in 5 nm increments using a PE Lambda 900, photometer sphere 0°/diffuse, on a PC sheet coated with the individual primer solution and made from Makrolon® 2808 (Bayer MaterialScience AG; medium-viscosity bisphenol A polycarbonate, MVR 10 g/10 min in accordance with ISO 1133 at 300° C. and 1.2 kg, without UV stabilisation). To obtain the absorbance of the pure primer layers from the result, the absorbance of the PC sheet (zero value) was subtracted from the total absorbance of the PC sheet and primer layer calculated from the transmission.

The absorbance values are given for a wavelength of 340 nm, as polycarbonate is particularly sensitive to UV light in this range and thus a high absorbance is required.

The absorbance of the primer layer can be calculated from the transmission using the following equation:

Absorbance of the primer layer (%):

$$E = \log_{10}(100/(\text{transmission of } PC \text{ sheet+primer layer } [\%])/(\text{transmission of pure } PC \text{ sheet } [\%]))$$

b) UV Absorbers Used

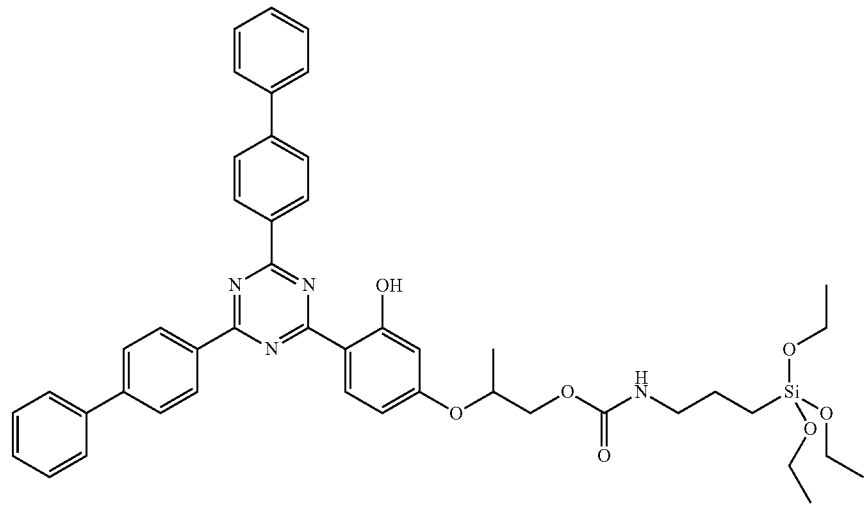

(I.1)

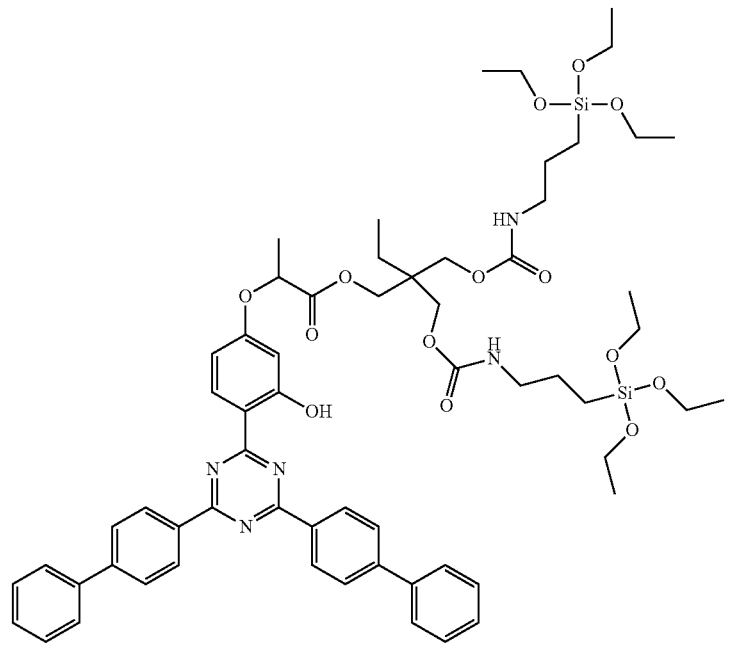

(I.2)

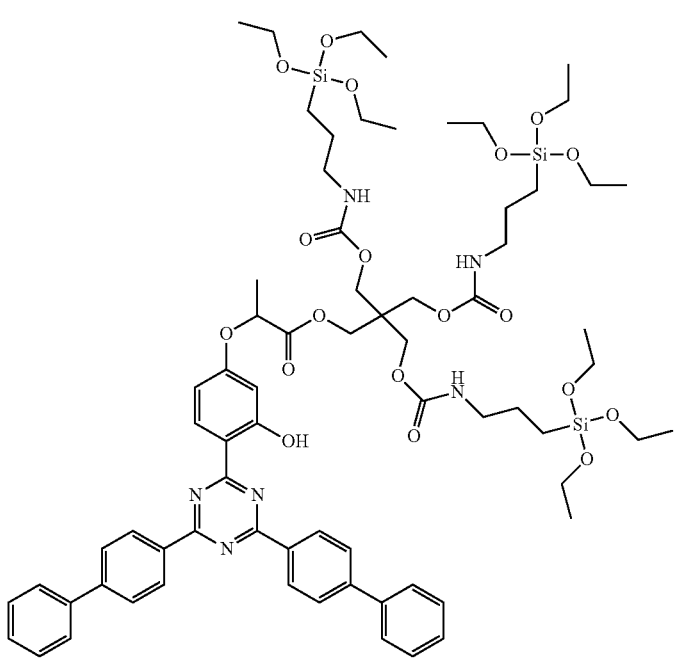

(I.3)

c) Production of Stock Solution A for the Primer Layer

A solids content of 10.5% was determined for the commercially available high-build primer SHP 470® (Momentive Performance Materials Inc., Wilton, Conn., USA) using method A.

In order to lie within the manufacturer's film thickness specification, this wet coat has to be diluted with a 1:1 solvent blend of diacetone alcohol and 1-methoxy-2-propanol. To this end sufficient solvent was added to the commercially available high-build primer SHP 470® that a solids content of 5.9% was then determined for the diluted SHP 470® (stock solution A) using method A (specified quantities).

d) Production of the Scratch Resistant Top Coat (A1-E1)

Either an AS4700® (UV-absorber-containing, polysiloxane-based scratch resistant coating from Momentive Performance Materials Inc., Wilton, Conn., USA) (A1) or solutions of AS4700® acidified with acetic acid were used as the scratch resistant top coat.

To this end 0.50 g of glacial acetic acid (100% acetic acid) were added to 24.50 g of AS4700® (A1) whilst stirring, such that a scratch resistant top coat solution B1 having an addition of 2.0 wt. % of acetic acid relative to the total coating quantity was obtained.

0.88 g of glacial acetic acid (100% acetic acid) were added to a further 24.12 g of AS4700® (A1) whilst stirring, such that a scratch resistant top coat solution C1 having an addition of 3.5 wt. % of acetic acid relative to the total coating quantity was obtained.

1.25 g of glacial acetic acid (100% acetic acid) were added to a further 23.75 g of A54700® (A1) whilst stirring, such that a scratch resistant top coat solution D1 having an addition of 5.0 wt. % of acetic acid relative to the total coating quantity was obtained.

e) Production of the Multilayer Systems

Examples 1a-1d

Comparative Tests 0.1 g of the UV absorber Tinuvin® 479 (Ciba, Switzerland) was added to 33.3 g of stock solution A whilst stirring, as a result of which primer solution 1A was obtained containing 5 wt. % of Tinuvin® 479 relative to the experimentally determined solids content of A of 5.9%. The wet coat was then filtered through a pressure suction filter (2-4 µm cellulose filter).

This primer solution 1A was applied by the flow-coating method to polycarbonate plaques (injection-moulded optical-grade polycarbonate (PC) plaques made from Makrolon® AL 2647 (medium-viscosity bisphenol A polycarbonate with UV stabiliser and mould release agent; MFR 13 g/10 min in accordance with ISO 1133 at 300° C. and 1.2 kg) and measuring 10×15×0.32 cm), allowed to dry for 15 min and cured for 15 min at 125° C.

The PC plaques primed with primer solution 1A were then overcoated with AS4700® (A1) or the scratch resistant top coat solutions B1, C1 or D1 by the flow-coating method, allowed to dry for 30 min and cured for 60 min at 130° C. (Examples 1a to 1d).

The film thicknesses of the primer and the scratch resistant top coat or the total film thickness of the multilayer systems produced (Examples 1a to 1d) were determined in accordance with method B and are approximately 3 to 7 µm. At a point at which the total film thickness is approximately 6 µm, the haze of the coated polycarbonate plaque was measured in accordance with method C and then the exact film thicknesses of the primer, interpenetration and scratch resistant layers were determined in the film thickness range using a thin section in accordance with method D.

To facilitate comparison, the film thicknesses are given in Table 1 as a percentage of the total film thickness of the coating, i.e. the quotient of the individual film thickness (primer/IPL or scratch resistant top coat) and the total film thickness is given.

TABLE 1

Haze and film thicknesses of Examples 1a to 1d
(primer layer containing Tinuvin ® 479)

| Example | Scratch resistant top coat | Haze at 6 μm | Film thickness primer (P) [%] | Film thickness IPL [%] | Film thickness scratch resistant top coat (SR) [%] |
|---|---|---|---|---|---|
| 1a | A1 | 0.3 | 28.8 | 5.8 | 65.4 |
| 1b | B1 | 1.3 | 22.2 | 12.2 | 65.8 |
| 1c | C1 | 2.9 | 24.7 | 15.8 | 59.5 |
| 1d | D1 | 3.9 | 20.4 | 22.5* | 57.1* |

*Rough estimate as the exact boundary between the IPL and the scratch resistant top coat can no longer be detected.

Examples 2a to 2d

According to the Invention 0.1 g of the UV absorber of formula I.2 was added to 33.3 g of stock solution A whilst stirring, as a result of which coating solution 2A was obtained containing 5 wt. % of UV absorber of formula I.2 relative to the experimentally determined solids content of A of 5.9%. The wet coat was then filtered through a pressure suction filter (2-4 μm cellulose filter).

This primer solution 2A was applied by the flow-coating method to polycarbonate plaques (injection-moulded optical-grade polycarbonate (PC) plaques made from Makrolon® AL 2647 (medium-viscosity bisphenol A polycarbonate with UV stabiliser and mould release agent; MFR 13 g/10 min in accordance with ISO 1133 at 300° C. and 1.2 kg) and measuring 10×15×0.32 cm), allowed to dry for 15 min and cured for 15 min at 125° C.

The primed PC plaques were then overcoated with AS4700 (A1) or the scratch resistant top coat solutions B1, C1 or D1 by the flow-coating method, allowed to dry for 30 min and cured for 60 min at 130° C. (Examples 2a to 2d).

The thicknesses of the layers of the multilayer systems of Examples 2a to 2d were determined in the same way as in Examples 1a to 1d. To facilitate comparison, the film thicknesses are given in Table 2 as a percentage of the total film thickness of the coating, i.e. the quotient of the individual film thickness (primer/IPL or scratch resistant top coat) and the total film thickness is given.

TABLE 2

Haze and film thicknesses of Examples 2a to 2d
(primer layer containing I.2)

| Examples | Scratch resistant top coat | Haze at 6 μm | Film thickness primer (P) [%] | Film thickness IPL [%] | Film thickness scratch resistant top coat (SR) [%] |
|---|---|---|---|---|---|
| 2a | A1 | 0.2 | 25.2 | 6.4 | 68.4 |
| 2b | B1 | 0.2 | 19.1 | 14.4 | 66.5 |
| 2c | C1 | 0.3 | 19.4 | 14.7 | 65.9 |
| 2d | D1 | 0.2 | 22.2 | 19.7 | 58.1 |

It can be clearly seen that the film thicknesses of the interpenetration layer (IPL) increase as the concentration of acetic acid in the scratch resistant top coat rises. The thicker the IPL, the better the crosslinking/adhesion of the two layers. By contrast, Examples 2a to d) according to the invention containing the UV absorber of formula I.2 have much lower haze values with comparable IPL film thicknesses than Examples 1a to d) containing the conventional UV absorber Tinuvin® 479, i.e. improved adhesion can be achieved with a thicker IPL without leading to haze in the multilayer system.

Tests with Equal Amounts of Triazine UV Absorbers

Tests were additionally performed with additions of equal amounts of UV absorber to obtain comparable extinction values. The extinction at 2 μm was measured separately for each primer layer, as the possibility cannot be excluded that some UV absorbers are less soluble than others. These measurements were performed on a base layer consisting of non-UV-stabilised Makrolon® 2808. The haze measurements were determined on the overall structure comprising primer layer and scratch resistant top coat with a total film thickness of 6 μm. As the IPL film thickness is dependent not on the added UV absorber but on the acetic acid content of the scratch resistant top coat and the values are thus comparable if the acetic acid concentration is the same, no further TEM images were recorded.

As in Examples 1 and 2, either AS4700® (UV-absorber-containing, polysiloxane-based scratch resistant coating from Momentive Performance Materials) or solutions of AS4700® acidified with acetic acid were used as the scratch resistant top coat. For Examples 3 to 7a new batch of AS4700® (A2) was used. As sol-gel coatings age, comparisons should only be made within the same batch.

To this end 0.50 g of glacial acetic acid (100% acetic acid) were added to 24.50 g of AS4700® (A2) whilst stirring, such that a scratch resistant top coat solution B2 having an addition of 2.0 wt. % of acetic acid relative to the total coating quantity was obtained.

0.88 g of glacial acetic acid (100% acetic acid) were added to a further 24.12 g of AS4700® (A2) whilst stirring, such that a scratch resistant top coat solution C2 having an addition of 3.5 wt. % of acetic acid relative to the total coating quantity was obtained.

1.25 g of glacial acetic acid (100% acetic acid) were added to a further 23.75 g of AS4700® (A2) whilst stirring, such that a scratch resistant top coat solution D2 having an addition of 5.0 wt. % of acetic acid relative to the total coating quantity was obtained.

Examples 3a to 3e

According to the Invention 0.35 g of the UV absorber of formula I.1 were added to 100.0 g of stock solution A whilst stirring, as a result of which primer solution 3A was obtained containing 5.6 wt. % of UV absorber (0.44 mmol) of formula I.1 relative to the experimentally determined solids content of A of 5.9%. The wet coat was then filtered through a pressure suction filter (2-4 μm cellulose filter).

This primer solution 3A was applied by the flow-coating method to polycarbonate plaques (injection-moulded optical-grade polycarbonate (PC) plaques made from Makrolon® 2808 (Bayer MaterialScience AG; medium-viscosity bisphenol A polycarbonate, MVR 10 g/10 min in accordance with ISO 1133 at 300° C. and 1.2 kg, without UV stabilisation) and measuring 10×15×0.32 cm), allowed to dry for 15 min and cured for 15 min at 125° C.

Examples 3a to 3d

The primed PC sheets were then overcoated with AS4700® (A2) or the scratch resistant top coat solutions B2, C2 or D2 by the flow-coating method, allowed to dry for 30 min and cured for 60 min at 130° C.

The total thickness comprising primer layer, IPL and scratch resistant layer of the multilayer systems of Examples 3a to 3d was determined in accordance with method B. For production reasons the thickness varies over the plaque from 3 to 7 μm. At a point at which the total film thickness is approximately 6 μm, the haze of the coated polycarbonate plaque was measured in accordance with method C (Table 3).

TABLE 3

Haze and film thicknesses of Examples 3a to 3d (primer layer containing I.1)

| Example | Scratch resistant top coat | Haze at 6 μm |
|---|---|---|
| 3a | AS4700 ® (A2) | 0.4 |
| 3b | B2 | 0.3 |
| 3c | C2 | 0.4 |
| 3d | D2 | 0.3 |

Example 3e

On the plaques primed with primer solution 3A the film thickness of the primer layer was determined in accordance with method B. At a point at which the total film thickness is approximately 2 μm the haze of the coated polycarbonate sheet was measured in accordance with method C. The absorbance and transmission of the primed plaques (without the scratch resistant layer) were measured and determined in accordance with method E and are shown in Table 7.

Examples 4a to 4e

According to the Invention 0.52 g of the UV absorber of formula I.2 were added to 100.0 g of stock solution A whilst stirring, as a result of which primer solution 4A was obtained containing 8.1 wt. % of UV absorber (0.44 mmol) of formula I.2 relative to the experimentally determined solids content of A of 5.9%. The wet coat was then filtered through a pressure suction filter (2-4 μm cellulose filter).

This primer solution 4A was applied by the flow-coating method to polycarbonate plaques (injection-moulded optical-grade polycarbonate (PC) plaques made from Makrolon® 2808 (Bayer MaterialScience AG; medium-viscosity bisphenol A polycarbonate, MVR 10 g/10 min in accordance with ISO 1133 at 300° C. and 1.2 kg, without UV stabilisation) and measuring 10×15×0.32 cm), allowed to dry for 15 min and cured for 15 min at 125° C.

Examples 4a to 4d

The primed PC plaques were then overcoated with AS4700® (A2) or the scratch resistant top coat solutions B2, C2 or D2 by the flow-coating method, allowed to dry for 30 min and cured for 60 min at 130° C.

The total thickness comprising primer layer, IPL and scratch resistant layer of the multilayer systems of Examples 4a to 4d was determined in accordance with method B. For production reasons the thickness varies over the plaque from 3 to 7 μm. At a point at which the total film thickness is approximately 6 μm, the haze of the coated polycarbonate plaque was measured in accordance with method C (Table 4).

TABLE 4

Haze and film thicknesses of Examples 4a to 4d (primer layer containing I.2)

| Example | Scratch resistant top coat | Haze at 6 μm |
|---|---|---|
| 4a | AS4700 ® (A2) | 0.2 |
| 4b | B2 | 0.2 |
| 4c | C2 | 0.2 |
| 4d | D2 | 0.4 |

Example 4e

On the plaques primed with primer solution 4A the film thickness of the primer layer was determined in accordance with method B. At a point at which the film thickness is approximately 2 the absorbance and transmission of the primed plaques (without the scratch resistant layer) were measured and determined in accordance with method E (Table 7).

Examples 5a to 5e

According to the Invention 0.63 g of the UV absorber of formula I.3 were added to 100.0 g of stock solution A whilst stirring, as a result of which primer solution 5A was obtained containing 9.6 wt. % of UV absorber (0.44 mmol) of formula I.3 relative to the experimentally determined solids content of A of 5.9%. The wet coat was then filtered through a pressure suction filter (2-4 μm cellulose filter).

This primer solution 5A was applied by the flow-coating method to polycarbonate plaques (injection-moulded optical-grade polycarbonate (PC) plaques made from Makrolon® 2808 (Bayer MaterialScience AG; medium-viscosity bisphenol A polycarbonate, MVR 10 g/10 min in accordance with ISO 1133 at 300° C. and 1.2 kg, without UV stabilisation) and measuring 10×15×0.32 cm), allowed to dry for 15 min and cured for 15 min at 125° C.

Examples 5a to 5d

The primed PC plaques were then overcoated with AS4700® (A2) or the scratch resistant top coat solutions B2, C2 or D2 by the flow-coating method, allowed to dry for 30 min and cured for 60 min at 130° C.

The total thickness comprising primer layer, IPL and scratch resistant layer of the multilayer systems of Examples 5a to 5d was determined in accordance with method B. For production reasons the thickness varies over the plaque from 3 to 7 μm. At a point at which the total film thickness is approximately 6 μm, the haze of the coated polycarbonate plaque was measured in accordance with method C (Table 5).

TABLE 5

Haze and film thicknesses of Examples 5a to 5d (primer layer containing I.3)

| Example | Scratch resistant top coat | Haze at 6 μm |
|---|---|---|
| 5a | AS4700 ® (A2) | 0.9 |
| 5b | B2 | 0.9 |

TABLE 5-continued

Haze and film thicknesses of Examples 5a to 5d
(primer layer containing I.3)

| Example | Scratch resistant top coat | Haze at 6 μm |
|---|---|---|
| 5c | C2 | 1.5 |
| 5d | D2 | 2.4 |

Example 5e

On the plaques primed with primer solution 5A the film thickness of the primer layer was determined in accordance with method B. At a point at which the film thickness is approximately 2 μm, the absorbance and transmission of the primed plaques (without the scratch resistant layer) were measured and determined in accordance with method E (Table 7).

Examples 6a to 6e

Not According to the Invention 0.3 g of the UV absorber Tinuvin® 479 were added to 100.0 g of stock solution A whilst stirring, as a result of which primer solution 6A was obtained containing 4.8 wt. % of UV absorber (0.44 mmol) Tinuvin® 479 relative to the experimentally determined solids content of A of 5.9%. The wet coat was then filtered through a pressure suction filter (2-4 μm cellulose filter).

This primer solution 6A was applied by the flow-coating method to polycarbonate plaques (injection-moulded optical-grade polycarbonate (PC) plaques made from Makrolon® 2808 (Bayer MaterialScience AG; medium-viscosity bisphenol A polycarbonate, MVR 10 g/10 min in accordance with ISO 1133 at 300° C. and 1.2 kg, without UV stabilisation) and measuring 10×15×0.32 cm), allowed to dry for 15 min and cured for 15 min at 125° C.

The primed PC plaques were then overcoated with AS4700® (A2) or the scratch resistant top coat solutions B2, C2 or D2 by the flow-coating method, allowed to dry for 30 min and cured for 60 min at 130° C.

The total thickness comprising primer layer, IPL and scratch resistant layer of the multilayer systems of Examples 6a to 6d was determined in accordance with method B. For production reasons the thickness varies over the plaque from 3 to 7 μm. At a point at which the total film thickness is approximately 6 μm, the haze of the coated polycarbonate plaque was measured in accordance with method C (Table 6).

TABLE 6

Haze and film thicknesses of Examples 6a to 6d
(primer layer containing Tinuvin ® 479)

| Primer | Scratch resistant top coat | Haze at 6 μm |
|---|---|---|
| 6a | AS4700 ® (A2) | 0.3 |
| 6b | B2 | 0.6 |
| 6c | C2 | 1.6 |
| 6d | D2 | 3.7 |

Example 6e

On the plaques primed with primer solution 6A the film thickness of the primer layer was determined in accordance with method B. At a point at which the film thickness is approximately 2 μm, the absorbance and transmission of the primed plaques (without the scratch resistant layer) were measured and determined in accordance with method E (Table 7).

TABLE 7

Transmission/absorbance values at 340 nm for primer layers 3A to 6A:

| Primer solution | Absorbance primer |
|---|---|
| 3A | 1.7 |
| 4A | 1.9 |
| 5A | 1.7 |
| 6A | 1.8 |

Summary: With the addition of equal amounts of UV absorber equal absorbance values are obtained for the examples. The addition of acetic acid causes the examples not according to the invention to become distinctly hazy, in contrast to the examples according to the invention.

The invention claimed is:

1. A multilayer system comprising a base layer comprising a thermoplastic, a primer layer, and a scratch resistant layer comprising a scratch resistant top coat, wherein said primer layer comprises a silylated UV absorber based on triazine and said scratch resistant layer is produced from a scratch resistant top coat comprising an acid, wherein said multilayer system further comprises an interpenetration layer (IPL), wherein the base layer (B), primer layer(s) (Pr), scratch resistant layer(s) (SR), and interpenetration layers assume one of the following layer sequences:

(B)-(Pr)-(IPL)-(SR)

(SR)-(B)-(Pr)-(IPL)-(SR)

(SR)-(IPL)-(Pr)-(B)-(Pr)-(IPL)-(SR), and wherein the film thickness ratio of said interpenetration layer to said scratch resistant layer is greater than 10%, wherein said silylated UV absorber based on triazine is selected from the compounds

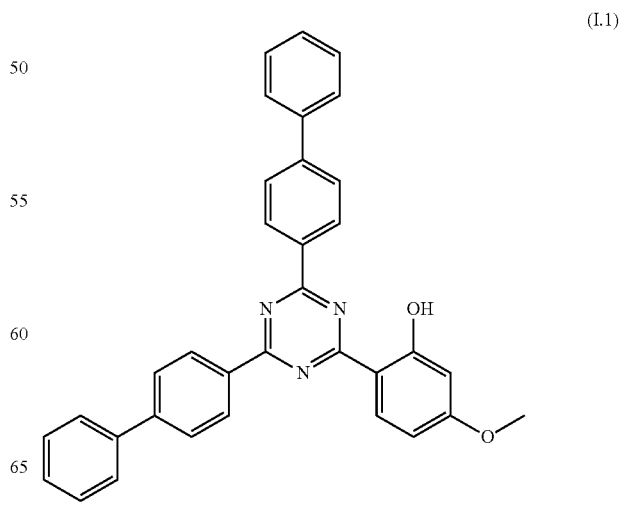

(I.1)

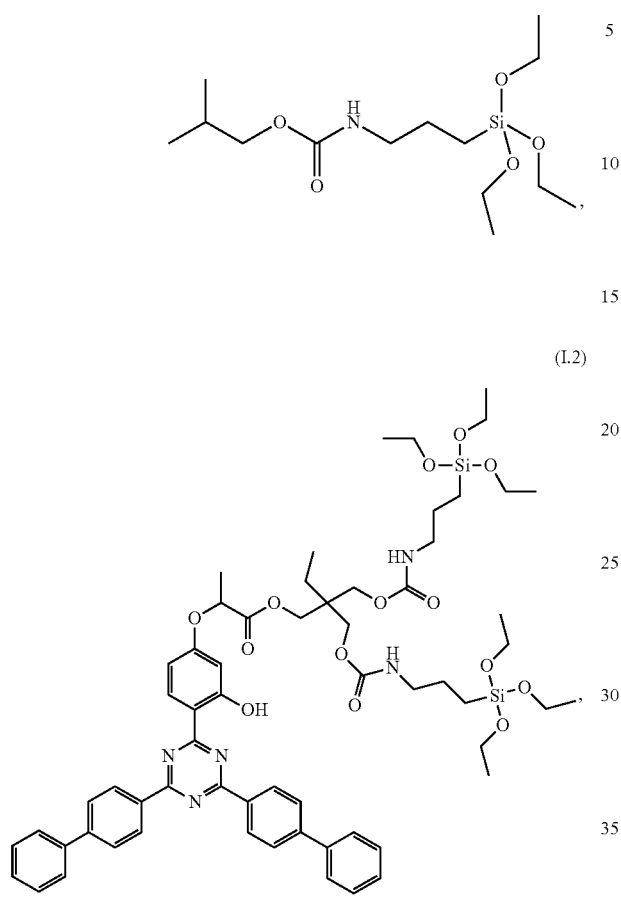
(I.2)
(I.3)
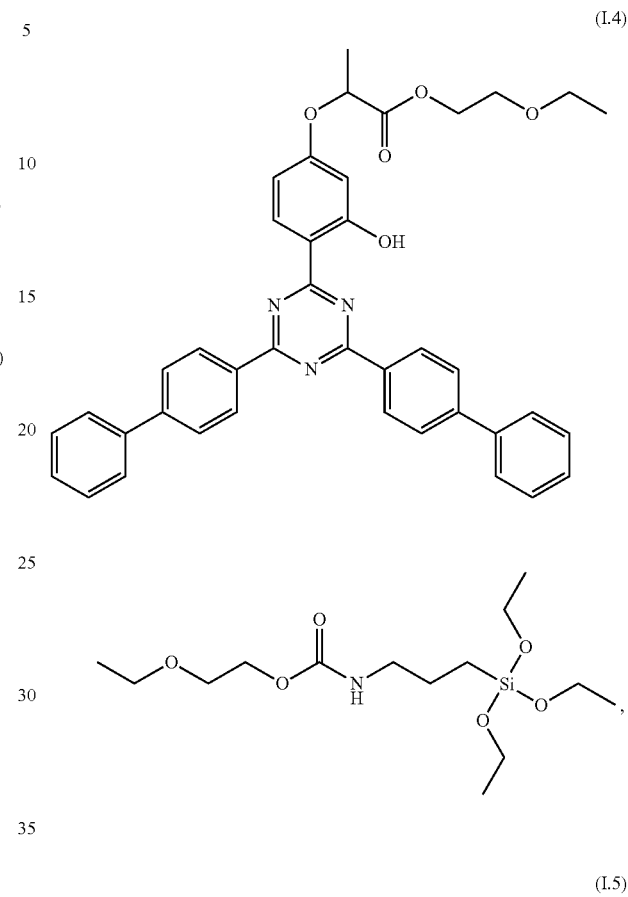
(I.4)
(I.5)

(I.6)

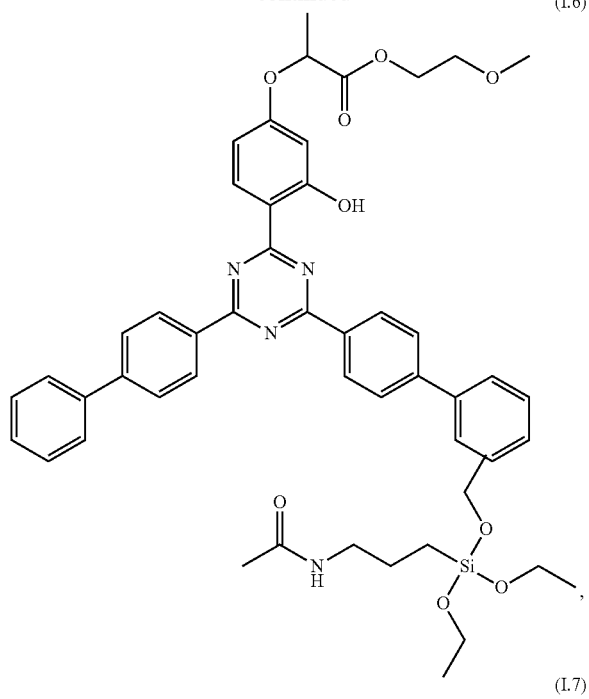

(I.7)

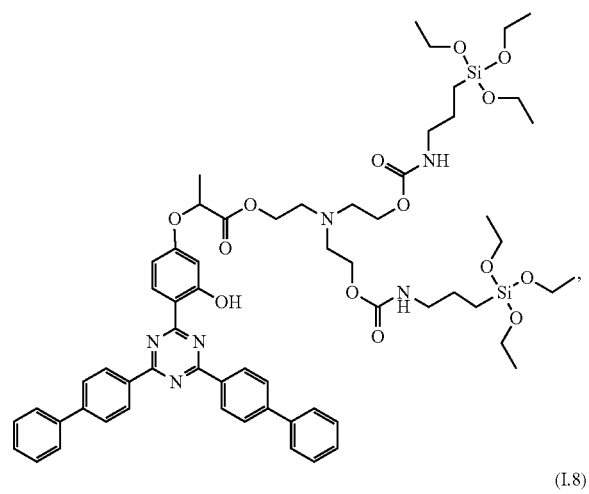

(I.8)

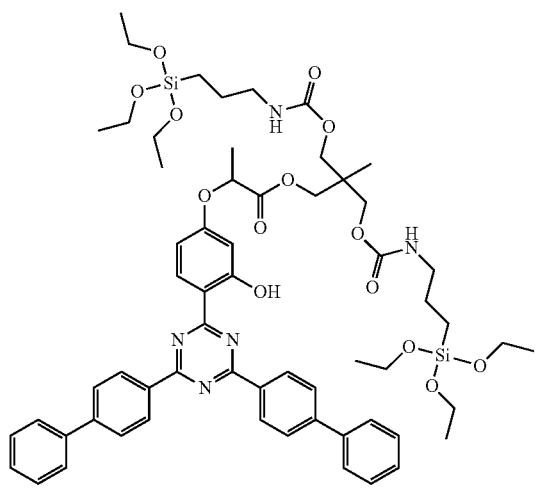

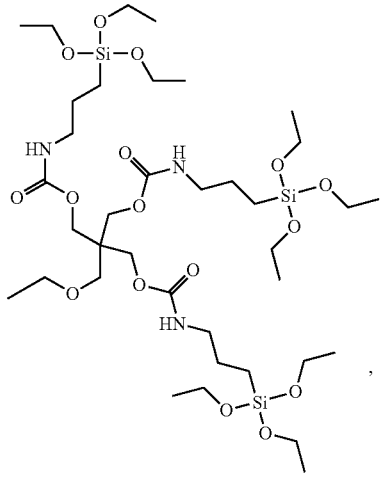

and said acid is acetic acid.

2. The multilayer system of claim 1, wherein said scratch resistant layer is produced from a scratch resistant top coat comprising from 0.1% to 15.0% of acetic acid.

3. The multilayer system of claim 1, wherein said scratch resistant layer comprises a hybrid coating to which acetic acid is added.

4. The multilayer system of claim 1, wherein said thermoplastic is selected from the group consisting of polycarbonate, polyester carbonate, polyester, polyphenylene ether, graft copolymer, poly(meth)acrylate, polystyrene, and copolymers thereof.

5. The multilayer system of claim 1, wherein said primer layer is produced from a primer formulation comprising binder material comprising polyacrylate, solvent, a silylated UV absorber based on triazine, and optionally further stabilisers, UV stabilisers, and other additives.

6. The multilayer system of claim 1, wherein said primer layer contains from 0.01 weight % to 15.00 weight % of the silylated UV absorber based on triazine.

7. The multilayer system of claim 1, wherein said multilayer system further comprises a functional or decorative layer.

8. A headlight cover, an architectural glazing system, or an automotive glazing systems comprising the multilayer system of claim 1.

9. A glazing system comprising the multilayer system of claim 1.

* * * * *